United States Patent [19]

Farnham

[11] 4,374,094

[45] Feb. 15, 1983

[54] METHOD AND APPARATUS FOR UNIFORM FLOW THROUGH RADIAL REACTOR CENTERPIPES

[75] Inventor: Robert A. Farnham, San Rafael, Calif.

[73] Assignee: Chevron Research Company, San Francisco, Calif.

[21] Appl. No.: 316,522

[22] Filed: Oct. 29, 1981

[51] Int. Cl.³ .............................. B01J 8/02; B01J 35/02
[52] U.S. Cl. ...................................... 422/218; 208/146
[58] Field of Search .............. 422/218, 220, 222, 232, 422/233, 310, 311; 208/146; 285/18, 24, 31

[56] References Cited

U.S. PATENT DOCUMENTS

| | | | |
|---|---|---|---|
| 2,614,033 | 10/1952 | Cornell et al. | 422/218 |
| 2,634,194 | 4/1953 | Nebeck | 422/218 |
| 2,635,989 | 4/1953 | Bonner | 422/218 X |
| 2,639,224 | 5/1953 | McAfee | 422/218 |
| 2,683,654 | 7/1954 | Bergman | 422/218 |
| 2,997,374 | 8/1961 | Lavender, Jr. et al. | 422/218 |
| 3,027,244 | 3/1962 | Byrne et al. | 422/218 |
| 3,167,399 | 1/1965 | Hansen, Jr. | 422/218 X |
| 4,033,727 | 7/1977 | Vautrain | 422/218 |
| 4,244,922 | 1/1981 | Burke et al. | 422/218 |
| 4,276,265 | 6/1981 | Gillespie | 422/218 X |

Primary Examiner—Richard L. Chiesa
Attorney, Agent, or Firm—Burns, Doane, Swecker & Mathis

[57] ABSTRACT

In a radial flow catalytic reactor, a gravity supported centerpipe is restrained from vertical upward movement due to thermal cycling of the catalyst and the reactor internals by forming the centerpipe to have uniform vertical and radial permeability in a frustoconical configuration. Gravity effect of the catalyst particles forming the bed act along the tapered side of the centerpipe. Additionally improved permeability to radial flow through the uniformly packed catalyst bed, independently of radial resistance to flow through the reactor due to pressure gradient between top and bottom of the vessel is achieved by compensation for differences in radial distance to the centerpipe from the upper portion to the lower portion of the catalyst bed by changes in the permeability of the tapered conical surface of the centerpipe. Uniformity of radial flow through the catalyst bed is assured by forming the conical portion of the centerpipe from rigid screen material so that reaction "dead" spots do not develop adjacent to the centerpipe.

7 Claims, 4 Drawing Figures

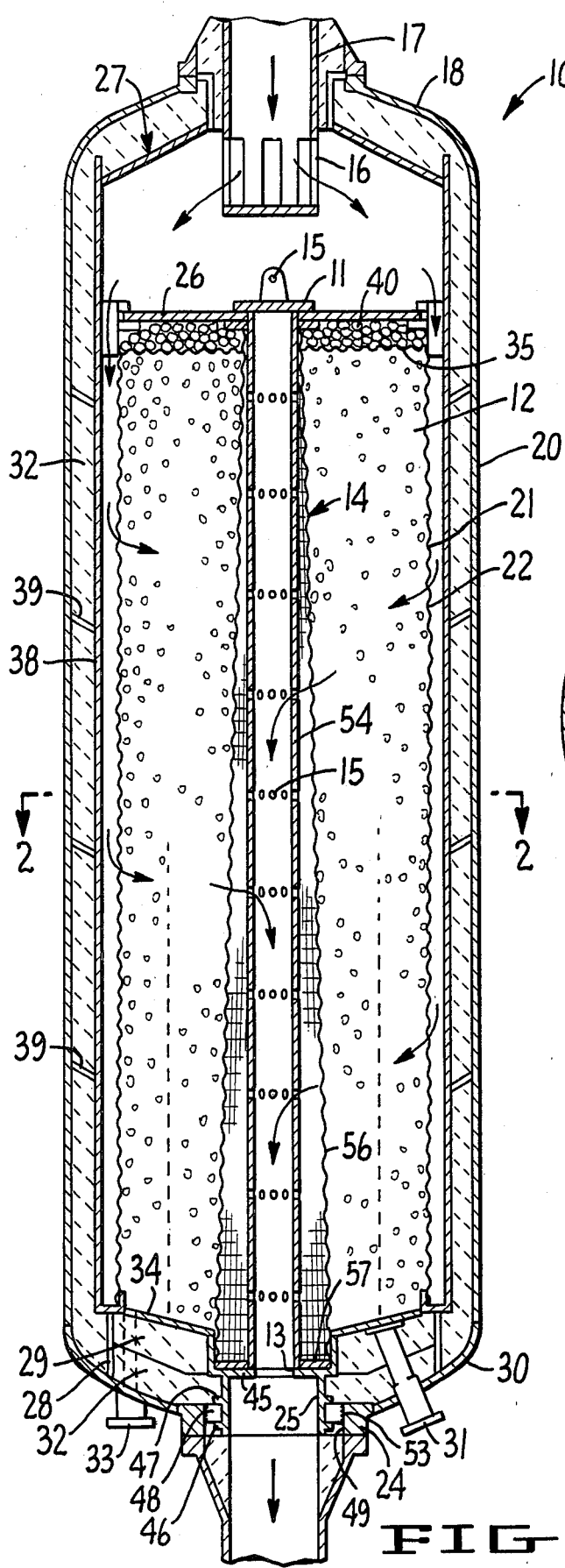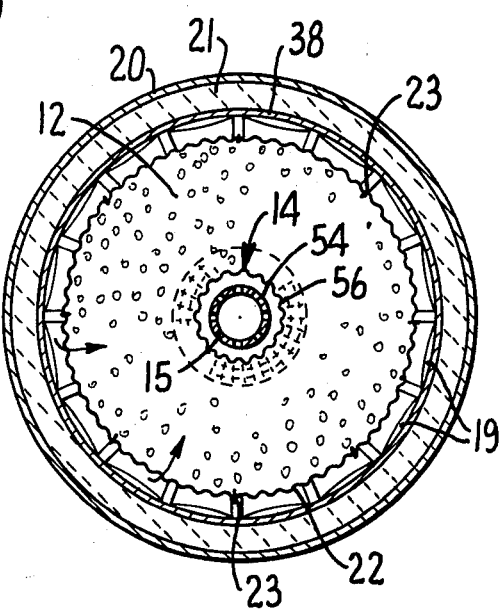
FIG. 1.
FIG. 2.

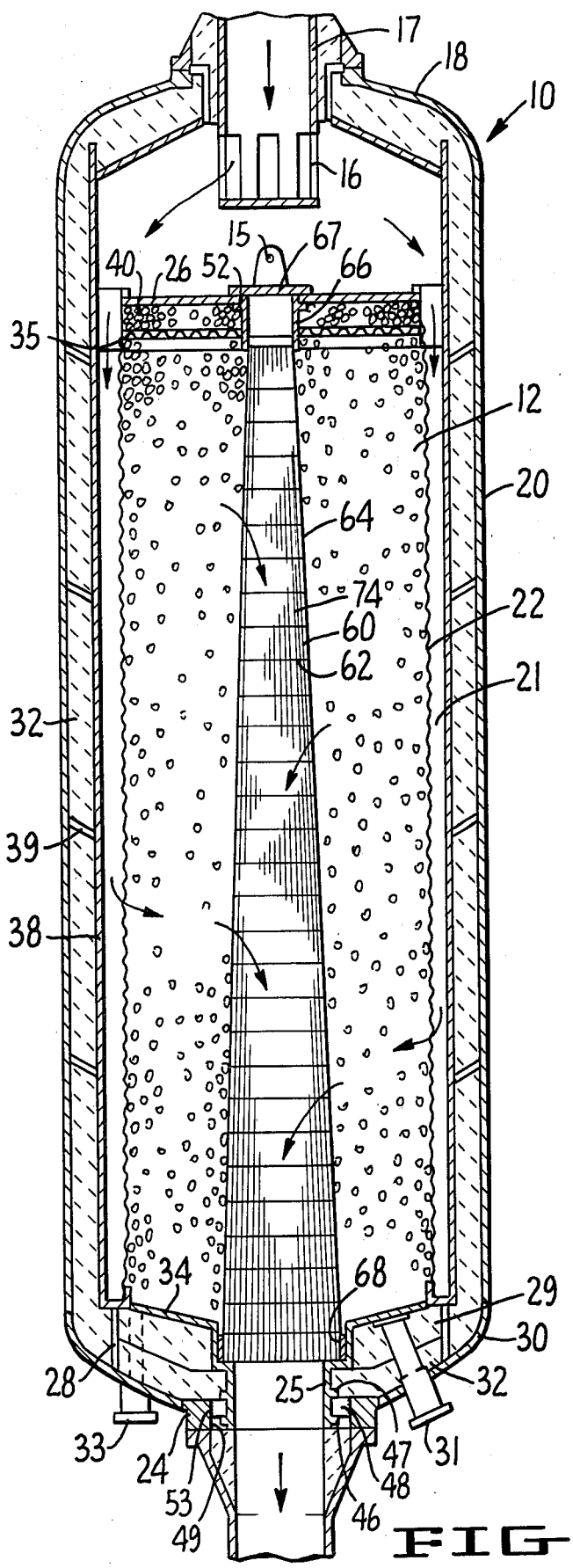
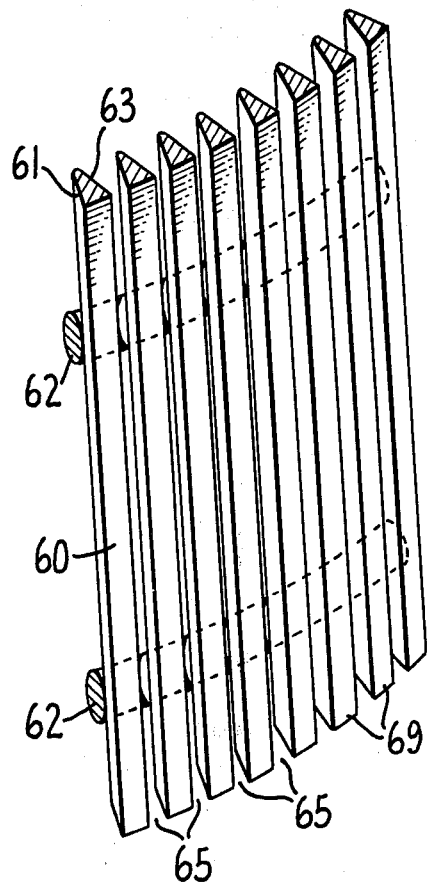
FIG. 3.
FIG. 4.

METHOD AND APPARATUS FOR UNIFORM FLOW THROUGH RADIAL REACTOR CENTERPIPES

FIELD OF THE INVENTION

This invention relates to radial flow catalytic reactors. More particularly it relates to a method of and apparatus for operating a radial flow reactor to restrain vertical movement of a gravity supported, uniformly permeable centerpipe due to differences of thermal expansion of fluids, catalyst and/or portions of the vessel structure during such catalytic reaction of hydrocarbons and simultaneously to improve the uniformity of radial flow through the catalyst bed along the length of the centerpipe.

DESCRIPTION OF THE PRIOR ART

It is a particular object of the invention to restrain vertical movement of a centerpipe in a radial flow catalytic reactor and at the same time improve uniformity of flow through the catalyst bed. In general, the "internals" of such radial flow reactors are gravity supported in a vertically elongated vessel and all such internals are inserted and removed through an enlarged opening, such as a manway, in the upper wall of the vessel. ("Internals" as used herein refers to the centerpipe, catalyst particles, and catalyst retaining screens forming the catalyst bed and providing annular space between the outer circumference of the bed and the reactor vessel sidewall including any insulating structure.) Where such a radial flow reactor operates at elevated temperatures, it is frequently desirable to insulate the interior wall of the vessel so that the outer steel wall operates near ambient temperature conditions. To avoid heat conduction from the vessel internals to the vessel walls, all such internals must be essentially gravity supported except for a few low thermal conductivity paths (e.g., thin web supports and the like), which may be welded to a vessel nozzle or entry pipe in the bottom wall of the vessel. Further, the depth of the socket support for the centerpipe is as short as possible to permit use of the full vertical height of the reactor for radial flow through the catalyst bed.

Radial reactors are frequently used in hydroprocessing of hydrocarbons. In such processing, hydrogen is used to influence cracking, isomerization or reforming of such hydrocarbons. To contain hydrogen and prevent hydrogen embrittlement of the steel vessel walls (due to hydrogen interaction with carbon in the steel) it is usually necessary to heat treat such reactor vessels (frequently 60 to 100 feet long and up to 30 feet in diameter) as a single entity. After such heat treatment it is undesirable to affix, as by welding, any portion of the internals to that vessel. Accordingly, such catalyst retaining members are supported in the vessel by gravity. Further, in either type of service, cold wall or hydroprocessing, it is highly desirable to be able to remove all internals for cleaning and inspection of the vessel at periodic intervals so as to assure its structural integrity and safety. Accordingly, it is conventional practice to support all internals, including specifically the centerpipe, by gravity on the bottom wall of such a vessel.

In radial flow reactors, fluid reactant generally enters the top of the vessel, flows downwardly in the annular space between the outer retaining screens and the wall, and then passes radially inward through the bed to the perforated centerpipe. Fluid in the centerpipe then leaves through an outlet at the bottom of the vessel. Alternatively, flow into the vessel may be inverted so that reactant enters the bottom periphery of the vessel, flows upwardly in the annular space between the vessel wall and catalyst bed, passes through the bed and leaves through a centerpipe communicating with a central lower outlet. Reverse flow is also possible. In such an arrangement, inlet flow of reactant fluids is upwardly in centerpipe, radially outward through the catalyst bed and out of the top of the vessel.

A particular problem of radial flow reactors is that for maximum efficiency such flow must be radially uniform over the generally cylindrical volume forming the bed. Catalyst particles frequently have a tendency to classify over certain levels within the extended vertical bed. In some cases, smaller catalyst particles may concentrate at the bottom. This results in the bed having less radial permeability near the bottom than near the top. In general, however, if flow is downward around the bed, the difference in pressure between the centerpipe and the annular space is lower at the top of the bed than at the bottom due to greater flow in the center pipe near the bottom. Further, flow through the bed may "channel" or preferentially flow through certain portions of the bed if the flow path from the bed into the centerpipe is not radially uniform from top to bottom. Accordingly, it is highly desirable to provide radial and longitudinal uniformity of flow through the entire catalyst bed and throughout the length of the centerpipe.

As also mentioned above, conventional radial reactors are usually subjected to temperature cycling, an alternate increase and decrease in the temperature of the vessel and its contents. The cycles are frequently from 200° to 500° C. or more in magnitude. Temperature cycling occurs, for instance, when an apparatus is heated and brought into service at an elevated operating temperature and subsequently withdrawn from service and cooled. Temperature cycling also occurs when contact material in the vessel is regenerated at an elevated temperature, or when there is a change in feed rate or a power outage. Apparatus employed in catalytic hydrocarbon conversion processes such as reforming, isomerization, hydrodesulfurization and hydrocracking are especially subject to temperature cycling. Because radial flow vessels of conventional design have removable vertical members such as centerpipes and contact material retaining screens, the problem is that these members tend to move vertically upward in the bed of catalyst material with each temperature cycle.

The reasons for such net upward movement of a centerpipe are not completely understood. Apparently, the centerpipe and retaining screen, upon being heated, expand in an upward direction. But upon being cooled, they contract from both ends toward a center neutral point. Thus, with each cycle, there is a net upward movement, frequently up to 1 centimeter or more. Eventually the member will rise enough from its mounting socket, or seat, to allow unwanted movement of the contact material. In the case of the centerpipe, if it moves away from the seat at the base of the vessel, contact material will flow under it, escape from the vessel and enter subsequent vessels such as heat exchangers. There the contact material can adversely affect fluid flow distribution or contacting efficiency, or shut down flow completely. Upward movement of a retaining screen at the top or around the periphery of the catalyst bed may lead to a drop in the level of contact material as the contact material fills the space under the screen and between the screen and the vessel wall. Displacement of the catalyst obstructs flow of the reactant which can cause coking and damaging local temperature rises. The effect of both a drop in catalyst level and a rise of the centerpipe is to decrease the depth of the contact material seal above the top perforation in the centerpipe. The decreased seal allows some of the feed to bypass the contact material, which leads to loss of product quality.

One arrangement for restraining centerpipe movement is shown and described in U.S. Pat. No. 4,244,922, issued Jan. 13, 1981, assigned to the assignee of this application. In that patent a horizontal surface is secured to the centerpipe in such a position that it carries a portion of the weight of the catalyst bed. The horizontal surface is in the form of a disk which either is secured to the pipe or rests upon a flange affixed to the centerpipe. This arrangement is quite satisfactory to prevent centerpipe vertical movement but presents some problems. If the flange is permanently fixed to the centerpipe, as by welding, the increased diameter interferes with insertion and removal of the pipe through the vessel manway. Further it may interfere with visual alignment and landing of the base of the centerpipe in the vessel support socket.

U.S. Pat. No. 4,033,727—Vautrain, issued July 5, 1977; U.S. Pat. No. 3,167,399—Hansen, issued Jan. 26, 1965 and U.S. Pat. No. 3,027,244—Byrne et al, issued Mar. 27, 1962, each discloses radial flow reactors having uniform diameter centerpipes which appear to be gravity supported on the bottom wall of the vessel, but without means for preventing upward movement of the centerpipe.

U.S. Pat. No. 2,997,374—Lavender et al, issued Aug. 22, 1961 discloses a radial flow ractor in which the centerpipe is permanently secured to the bottom wall of the reactor vessel.

U.S. Pat. No. 2,635,989—Bonner, issued Apr. 21, 1953 discloses a radial flow reactor in which the centerpipe enters either the top or bottom of the reactor and is composed of a vertical series of cones or cylinders of decreasing diameter from the inlet to the outlet end of the vessel. The centerpipe is permanently affixed to the end wall of the reactor vessel.

SUMMARY OF THE INVENTION

In accordance with the present invention uniform radial flow through the catalyst bed over the cylindrical length of the catalyst body is achieved and the centerpipe is restrained from rising vertically under thermal cycling by forming such centerpipe with uniform radial and longitudinal permeability in a generally conical form, with the diameter tapering inwardly from the gravity support at the bottom end wall of the reactor vessel toward the upper end wall. With the centerpipe substantially uniformly permeable and the outer periphera of the cylindrical catalyst bed having uniform spacing from the sidewall of the vessel, radial pressure drop across the bed is made more uniform to improve catalyst contact with reactant fluids in, and hence product yield from, the reactor. To permit gravity support for the centerpipe the vessel's lower end wall includes a seat, or socket, sufficiently deep to support the central pipe in an erect position. Segments, or arcuate sections, of screens disconnectably attached to each other are placed adjacent the vessel sidewall to enclose a generally cylindrical bed of retained catalyst particles. Such segments likewise extend a desired distance above the centerpipe to assure that the permeable wall at the top of the pipe is covered by catalyst particles to a desired depth. The top of the catalyst bed supports a plurality of arcuate plates, or segments, to vertically confine the bed. Further, the vertical screen segments are radially spaced inwardly from the vessel sidewall to provide an annular flow path along the length and around the circumference of the catalyst bed so that reactant may flow more uniformly to or from the uniformly permeable centerpipe. In a preferred form, the centerpipe is formed by uniformly permeable screen means in the form of vertical bars uniformly spaced apart around the circumference. The bars are so held by hoop members bonded to the vertical bars at longitudinal spaced intervals of approximately equal distances. The resulting screen means is then formed to have a generally conical shape for the centerpipe. This permits uniform flow through the tapered catalyst bed and throughout the full length of the centerpipe without substantial movement of catalyst particles therethrough. In one form a cylindrical pipe member is enclosed within and runs coaxially with the screen means. In another form, the screen means includes short sections of pipe at the top and bottom only. Further, the taper in such centerpipe permits loading a greater total volume of catalyst particles into a vessel having a given volume for catalyst.

BRIEF DESCRIPTION OF DRAWINGS

In the drawings:

FIG. 1 is a vertical elevation view, partially in cross-section, of a radial reactor vessel suitable for performing the method of the present invention including a preferred embodiment of a uniformly permeable and conically tapered screen member concentric with a perforated cylindrical pipe member to form the column strength means for the centerpipe;

FIG. 2 is a cross-sectional plan view of the vessel and centerpipe arrangement shown in FIG. 1, taken in the direction of arrows 2—2;

FIG. 3 is a vertical elevation view, in cross section, of an alternative form of a vertically tapered centerpipe having uniform permeability formed of screen means with sections of impermeable cylindrical pipe only at the top and bottom to form respectively an upper seal and a gravity seat for the pipe.

FIG. 4 is an enlarged view of the permeable side wall portion of the embodiment shown in FIG. 3.

DETAILED DESCRIPTION OF THE PREFERRED EMBODIMENT

Referring now to FIG. 1 of the drawing, a radial flow reactor vessel 10 supports a generally cylindrical bed 12 of catalyst particles. A uniformly permeable tapered, or frustoconical, centerpipe 14, constructed in accordance with my invention, extends vertically and axially through bed 12. Flow of hydrocarbons to be processed in bed 12 (as indicated by arrows) is from inlet distributor 16 in manway 17 through the upper end wall 18 of vessel 10, and into bed 12 from the annular space 21 between sidewall 20 of vessel 10 and the retaining screen means 22 for bed 12. Tapered centerpipe means 14 preferably comprises an outer, uniformly permeable, screen means 56 tapered inwardly from lower end wall 30 toward upper end wall 18 and a cylindrical perforated pipe, such as pipe body 54. Pipe 54 is perforated, as by holes 15, along its length. Such holes may be spaced apart in rows, as shown, or uniformly spaced the entire length at close intervals (say 3" apart). Flow out of vessel 10 is through the outlet opening in flange 24. While as indicated, holes 15 may be drilled through pipe 54 in rows, preferably such passageways are more uniformly distributed over the length and circumference of pipe means 54. Due to differences in flow rates at the top and bottom of centerpipe means 14, it is preferred to increase the rate of flow at the top of pipe member 54 with larger or more closely spaced holes 15. Further, the permeability of screen member 56 may be increased at the top as compared to the base end 13. If desired, the upper end of pipe member 54 may be entirely omitted, or it may be tapered within screen 56 to increase overall volume of catalyst bed 12.

Desirably the entire assembly of centerpipe means 14, retainer screen means 22, formed by a plurality of segments 23, having dished or scalloped portions 19, (as best shown in FIG. 2), catalyst bed 12 and cover 26, likewise formed by segments, is supported by gravity on lower end wall 30 of vessel 10. In the arrangement of FIG. 1, vertical support ring 28 provides a base for screen segments 23. Because vessel 10 in the present embodiment is intended to operate as a cold wall reactor, an internal shell 38 is also mounted on support ring 28 and is spaced from outer wall 20 by canted annular rings 39. Rings 39 are vertically spaced apart, and as with ring 28, are relatively thin compared to their length to form low thermal conductive paths between shell 38 and outer vessel side wall 20. The internal reaction volume of vessel 10 is insulated from upper wall 18 by a spacer such as annular disc 27. The bottom, side and top of vessel 10 is then filled with insulative cement or aggregate 32 to provide the necessary insulation. The upper portion 29 of bottom insulation is preferably coarse sand, covered with plate means 34, also formed in segments. Plate means 34 provides a base for catalyst bed 12.

As discussed above, it is essential that all portions of the internals (apart from the thermal insulation means) of vessel 10 be removable, as through manway 17 in upper end wall 18. For this reason tapered centerpipe 14 must be removable. As will be apparent, the present size and taper of centerpipe 14 is somewhat exaggerated to illustrate its construction. However, the structure is such that the full diameter of base 13 will readily pass through manway 17. Further, if the top end 11 is substantially reduced in diameter, the total volume of catalyst that can be packed into bed 12 may be significantly increased by such taper. To support permeable tapered centerpipe means 14 in a vertical position and substantially coaxial with vessel 10, a socket, or support seat 25 is positioned within flange 24.

Preferably, socket 25 is cylindrical with an internal ring seat 45 for the lower end 13 of tapered centerpipe 14. It also includes a pair of external mounting collars 46 and 47. Radial ribs 48 welded to the inner circumference of opening 49 in flange 24 of lower wall 30 of vessel 10 secure socket 25 in place. It is to be particularly noted that ribs 48 are thin as compared to its radial length and are secured only to opening 49 by welds 53 to assure a low heat conductivity path from collars 46 and 47 of socket 25 to flange 24. Desirably the length of socket 25 is on the order of 4 to 8 inches for a centerpipe having a length of 20 to 30 feet. Although socket 25 may be tapered outwardly a few degrees to assist insertion and removal of centerpipe means 14, in general it is preferably cylindrical along its length, to frictionally engage the outer surface of screen 56 at lower end 13. This prevents catalyst fines or particles from entering socket 25 if centerpipe means 14 "creeps" upward under variable thermal conditions, or thermal cycling.

The configuration of screen member 56 of centerpipe means 14 is frustoconical from circular plate 57 at support end 13 to closed end 11 at the top of screen 56 and pipe member 54. Such form provides a gravity restraining force along the length of pipe means 14 from the gravity effect of the freely movable catalyst particles. The gravity effect may be applied through action of the catalyst particles on overlying screen 56, as in FIG. 1 or directly to the wall of pipe 64, as in the arrangement of FIG. 4. Such gravity effect prevents upward creep of end 13 out of socket 25. Distribution of gravity force on screen member 56 of pipe means 14 readily holds the centerpipe axially in a center position within bed 12 and vessel 10, as well as preventing it from rising longitudinally. As noted above, such longitudinal or vertical creep in previously known radial flow reactors has resulted in escape of catalyst particles into the process effluent stream through its seat, such as 25. The arrangement also permits use of a shorter socket than would otherwise be required to accomodate such upward "ratcheting" of centerpipe 14. Such a shorter socket permits more efficient use of the length of vessel 10 for flow through catalyst bed 12 and centerpipe means 14.

It will also be understood by those skilled in the art of radial flow reactors of the type (wherein a gravity supported centerpipe is most useful) that the overall length of vessel 10 is dictated by cost for effective reactor throughput (generally limited by reactor volume). Accordingly, a relatively long centerpipe, say 30 feet, and a short socket, say 3 to 6 inches, are desirable. The present invention assures adequate gravity support with a minimum length of socket, so that maximum length of the centerpipe is available to the catalyst bed within a given volume of vessel 10.

Further, the gravity effect of catalyst particles on centerpipe means 14 prevents upper end 11 from rising out of the top of bed 12. Since the segments forming cover 26 lie directly on a layer of spheres or balls 40 resting on screen 35 which closes off the top of bed 12, such vertical movement of centerpipe means 14 may uncover the upper end of conical screen member 56 overlying pipe 54 so that reactant fluids could by-pass bed 12 with accompanying loss of efficiency or degradation of products.

A further significant advantage of the generally conical shape of screen 56 of centerpipe means 14 is to improve radial flow throughout bed 12. It has long been appreciated that radial flow vessels are subject to considerable variations in flow over various parts of the entire cylindrical body of catalyst particles. Under relatively low flow conditions and uniform permeability of the catalyst bed, catalytic reaction in such reactors is highly efficient. However, with high flow rates and non-uniform permeabilities, fluids "channel" or "stratify" through selected flow paths, generally those paths with the greatest permeability.

In the arrangement of FIG. 1, screen 56 is radially displaced from pipe member 54, to produce uniform permeability of the entire body of catalyst bed 12. Thus, the full bed is available to promote catalytic reaction of hydrocarbons flowing therethrough and without low flow or "dead" spaces in portions of the bed that are not directly adjacent to ports, or perforations, 15 in pipe 54. Such spaces intermediate the perforations can result in coking of the catalyst particles therein. Coking may either cause hot spots in the catalyst bed or partial plugging. Neither condition is desirable. Accordingly a more even distribution of fluid flow is obtained while at the same time centerpipe means 14 is made resistant to vertical displacement due to thermal cycling.

FIG. 3 shows an alternative embodiment of a centerpipe means 64 wherein the screen member 74 is formed with a tapered, or frustoconical shape to accomplish the functions of the present invention. As indicated in FIG. 4, a preferred form of the screen is a plurality of vertical bar members 60 equally spaced from each other and bonded to spaced apart hoop member 62, as by welding. For flow from annular space 21 to centerpipe 64, and to restrain catalyst movement with fluid flow, bars 60 are arranged with the wedge faces 61 and 63 directed inwardly. A specific advantage in such construction is to prevent plugging by small particles bridging the open spaces 65 between the external faces 67 of bars 60. As best seen in FIG. 3, hoops 62 are spaced apart at suitable intervals along the length of centerpipe 64 to give structural stability against the hydrostatic head of the catalyst bed at each level along pipe 64. A suitable cap member, such as pipe stub 66 and cover 67 encloses the upper end of centerpipe 64 above the top of bed 12. The socket base end, in the form of open pipe section 68, is secured to the lower ends of bars 60. Although not shown, bars 60 may be formed as circular members, each with progressively smaller diameters between base pipe 68 and cap pipe 66 to form the uniformly permeable conical centerpipe 64. The circular members are then secured in their axially spaced apart positions by radially spaced and inwardly tapered rods extending between base pipe 68 and cap 66.

In the arrangement of both FIGS. 1 and 3 screen member 56 (FIG. 1) or screen 74 (FIG. 3) may be made up of several cylindrical portions of bars 60 and hoops 62, each portion having a decreasing diameter and secured end to end to form a stepped, generally conical centerpipe.

It is frequently desirable to be able to easily remove the catalyst bed before attempting regeneration of catalyst, or other servicing of reactor 10. Catalyst particles may be drained through flange 31 which penetrates through bottom plate 34. Flange 33 may be used to extract samples of catalyst particles during normal operation, as well as to assist in removing catalyst bed particles. After removal of the catalyst, the individual internal elements may be removed, (or installed). As shown, to assist in removal or installation of conical center pipe 14, a lifting lug or eye 15 is secured to upper end 11 (FIG. 1) or plate 67 (FIG. 3). Ring 52 holds the segments of cover 26 in place on balls 40 over screen 35.

The present embodiments of the invention have been described in connection with flow of reacting hydrocarbons into vessel 10 by flow distributor 16 and effluent exiting through outlet 24. However, reverse flow from centerpipe 14 radially outward through bed 12 to annular space 22 is possible with all of the advantages of such conical centerpipe retained as to restraint against thermal movement and use of a relatively short socket to pipe length.

While only a few examples of the preferred embodiment of the invention have been shown and described, various modifications or changes in both the method and apparatus will occur to those skilled in the art. All such modifications or changes coming within the scope of the appended claims are intended to be included therein.

I claim:

1. A method of preventing longitudinal displacement of the centerpipe of a radial flow catalytic reactor vessel due to thermal cycling of fluids flowing therethrough and differences in thermal expansion of said centerpipe with uniform permeability of radial flow for reactant fluids through the catalyst bed along the length of said centerpipe which comprises positioning a centerpipe centralizing socket member in the lower end wall of said vessel, seating a centerpipe in said socket member sufficiently deep to maintain said centerpipe in a vertical position extending axially parallel to a substantial portion of the sidewall of said vessel, said centerpipe being formed throughout its length as a screen member having frustoconical shape whose diameter decreases from said socket member toward the upper end wall of said vessel, said screen member having uniformly spaced openings throughout its circumferential surface over said length, enclosing said screen member of said centerpipe within a generally cylindrical body of catalyst particles extending radially outward from said centerpipe to a location adjacent to said vessel sidewall, and forming vertical passageways between said sidewall of said vessel and said body of catalyst particles to permit radial flow of reactant fluids through said body between said wall and said centerpipe so that the permeability to fluid flow across said body of such radial flow is substantially uniform throughout the length of said frustoconical centerpipe and thermal cycling is resisted by the gravity component of said cylindrical catalyst bed along the length of said frustoconical centerpipe.

2. In a radial flow reactor vessel having inlet and outlet passageways, means for retaining a generally cylindrical bed of catalyst particles extending through said reactor and so arranged as to permit radial fluid flow between the center of said bed and the peripheral area of said cylindrical bed, a perforated centerpipe member extending through said catalyst bed, said reactor having a sealable access opening in the upper end of said vessel for installation and removal of said catalyst particles, said perforated centerpipe member, and said retaining means, the improvement comprising a centerpipe seat member mounted at the lower end of said vessel in fluid communication with said outlet passageway, a centerpipe having one end formed to frictionally engage said seat member for support thereof coaxially with said reactor vessel, and having a diameter which is tapered inwardly from said seat end to the other end thereof to increase the radial distance for fluid flow through said cylindrical catalyst bed from said one end to said other end of said centerpipe, a catalyst engaging surface of said centerpipe being formed as a tapered screen member having substantially uniform permeability to fluid flow throughout the length of said centerpipe from said seat end to the enclosed upper end thereof.

3. A centerpipe in accordance with claim 2 wherein, said centerpipe includes a cylindrical pipe member within said screen member and said screen member covers a substantial portion of the length of said pipe member.

4. A centerpipe in accordance with claim 2 wherein the taper of said centerpipe is formed as a frustoconical member decreasing in diameter from said seat end.

5. A centerpipe in accordance with claim 2 wherein said screen member comprises a plurality of elongated bar member equally distributed around the surface of said screen member and said bar members are secured to hoop members longitudinally spaced along said centerpipe.

6. A method of assembling a catalytic reactor vessel wherein fluids being reacted therein flow between the sidewall of said vessel and a perforated central conduit extending substantially coaxially with said sidewall, which comprises positioning a centralizing socket member on the lower end wall of said vessel, said socket member providing a flow path for reactant fluids out of said vessel, seating said conduit in said socket member sufficiently deep to maintain said conduit in a vertical position and extending axially parallel to a substantial portion of the sidewall of said vessel, said conduit being tapered throughout its length so that the diameter thereof decreases toward the upper end wall of said vessel, said tapered conduit member being formed with a catalyst contact surface thereof having uniform permeability to fluid flow throughout its length, enclosing said tapered conduit within a cylindrical body of catalyst particles extending outwardly from said tapered conduit toward said vessel sidewall and extending above the permeable surface of said tapered conduit, and forming vertical elongated passageways in the annular space between said vessel sidewall and said body of catalyst particles to permit radial flow of reacting fluids between said annular space and said conduit through said catalyst body so that the pressure difference between said upper end wall and said lower end wall is compensated by the permeability of said conduit and the permeability across the radial distance between said sidewall and said tapered conduit member and the taper of said conduit permits the vertical component of gravity to act on the side of said conduit to resist unseating of said conduit from said socket member due to thermal cycling of said catalyst and said vessel.

7. Method of assembling a hydroprocessing reactor wherein an axially elongated reactor vessel includes an internal structure permitting radial flow between the central portion of said vessel and the axially elongated walls of said vessel, said internal structure being removable through an access opening in the upper wall of said vessel and said internal structure supported by gravity on the lower end wall of said vessel, which comprises positioning a centralizing socket member to communicate with a flow passageway through said lower end wall of said vessel, seating one end of a centerpipe member in said socket member sufficiently deep to maintain said centerpipe vertical and axially parallel to a substantial portion of the length of said sidewall, said centerpipe member being formed throughout its length as a conical section whose diameter decreases from said socket member toward said upper end wall, said centerpipe having an external screen member with a surface uniformly permeable to fluid flow therethrough, enclosing said centerpipe within a body of catalyst particles extending outwardly from said centerpipe, confining said particles adjacent said vessel sidewall to form an annular vertical passageway between said vessel sidewall and said body of catalyst particles to permit radial flow of reacting fluids from the cylindrical surface of said body to said centerpipe whereby thermal cycle lifting of said centerpipe is resisted by the gravity effect of said catalyst body on said screen member of said centerpipe and the permeability throughout the length of said cylindrical catalyst body adjacent said centerpipe is more uniform for radial flow over the length of said screen member.

* * * * *